(12) United States Patent
Du et al.

(10) Patent No.: US 10,719,844 B2
(45) Date of Patent: Jul. 21, 2020

(54) SERVICE PROCESSING METHOD, TERMINAL AND SERVER

(71) Applicant: Tencent Technology (Shenzhen) Company Limited, Shenzhen, Guangdong (CN)

(72) Inventors: Yuxuan Du, Guangdong (CN); Mingyu Li, Guangdong (CN); Zhenyu Xu, Guangdong (CN); Jun Qin, Guangdong (CN); Zhihao Liu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 226 days.

(21) Appl. No.: 15/667,013

(22) Filed: Aug. 2, 2017

(65) Prior Publication Data
US 2017/0345042 A1 Nov. 30, 2017

Related U.S. Application Data

(63) Continuation of application No. PCT/CN2016/077363, filed on Mar. 25, 2016.

(30) Foreign Application Priority Data

Mar. 27, 2015 (CN) .......................... 2015 1 0140254

(51) Int. Cl.
 *G06Q 30/02* (2012.01)
(52) U.S. Cl.
 CPC ................ *G06Q 30/0225* (2013.01)
(58) Field of Classification Search
 CPC ................. G06Q 30/0207–0277; G06Q 30/02
 (Continued)

(56) References Cited

U.S. PATENT DOCUMENTS

2003/0163374 A1* 8/2003 Akiyama ........... G06Q 30/0225
 705/14.26
2008/0065490 A1* 3/2008 Novick ................ G06Q 20/204
 705/14.26
(Continued)

FOREIGN PATENT DOCUMENTS

CN 102354419 A 2/2012
CN 102592241 A 7/2012
(Continued)

OTHER PUBLICATIONS

Second Office Action with Translation Issued for Chinese Patent Application No. 201510140254.8 dated Dec. 22, 2017.
(Continued)

*Primary Examiner* — Vincent M Cao
(74) *Attorney, Agent, or Firm* — Brinks Gilson & Lione

(57) ABSTRACT

A service processing method, a device, a terminal and a server are provided. In some embodiments, the method includes: obtaining an operator identifier, when a coupon verification operation is detected on a service page of a public service account; invoking a code reading interface of an internet application to which the public service account belongs, to obtain a code of a coupon to be verified; generating a coupon verification service request based on the operator identifier and the code of the coupon; sending the coupon verification service request to a server, to cause the server to process a coupon verification service based on the operator identifier and the code of the coupon and return a process result to the terminal; and outputting the process result on the service page of the public service account.

20 Claims, 10 Drawing Sheets

(58) Field of Classification Search
USPC .......................................... 705/14.1–14.73
See application file for complete search history.

(56) References Cited

U.S. PATENT DOCUMENTS

| | | | | |
|---|---|---|---|---|
| 2009/0265638 | A1* | 10/2009 | Carapelli | G07F 9/023 715/741 |
| 2010/0010904 | A1* | 1/2010 | Sanders | G07F 19/202 705/21 |
| 2012/0158469 | A1* | 6/2012 | Brewer | G06Q 30/0207 705/14.1 |
| 2012/0323665 | A1 | 12/2012 | Xu et al. | |
| 2013/0054336 | A1* | 2/2013 | Graylin | G06Q 40/02 705/14.26 |
| 2013/0159200 | A1* | 6/2013 | Paul | G06Q 30/012 705/305 |
| 2014/0298027 | A1* | 10/2014 | Roberts | G06Q 20/20 713/171 |

FOREIGN PATENT DOCUMENTS

| | | |
|---|---|---|
| CN | 104021468 A | 9/2014 |
| CN | 104268691 A | 1/2015 |
| CN | 104268748 A | 1/2015 |
| CN | 104751352 A | 7/2015 |
| JP | 2003/108907 A | 4/2003 |

OTHER PUBLICATIONS

CSDN Blog: Wechat Public Platform Card Function. http://blog.csdn.net/pondbay/article/details/40341851, dated Oct. 21, 2014, pp. 1-2.

International Search Report with International Application No. PCT/CN2016/077363 dated Jun. 29, 2016 in 2 pages.

Certifications write-off assistant, wechat service public number, comprehensive upgrade, and Rename to "Certifications merchant assistant" Wechat team with Translation From http://www.mamicode.com/info-detail-327755.html on Nov. 22, 2014, p. 1, figure 1.

Office Action with Translation Issued in Chinese Application No. 201510140254.8 dated Jul. 19, 2017.

* cited by examiner

| < return | code inputting verification |
|---|---|

| | OK |
|---|---| please present a coupon and input a serial number of the coupon

| 1 | 2 | 3 |
|---|---|---|
| 4 | 5 | 6 |
| 7 | 8 | 9 |
|   | 0 | ⟨×] |

Figure 4c

| < return | coupon verification |
|---|---|

| XX 30% discount ticket |
|---| validity date:20XX-XX-XX
serial number:8888 8888 7777 6666 usage details:XXXXXXXXX usage instructions:XXXXXXXXXXXXXx

| | successful verification | |
|---|---|---|

Figure 4d

| < return    verification record |
|---|
| merchant:XXX store<br>Address:XXXXxx |
| XX 30% discount ticket<br>Operator:yy |
| YY 100 RMB token<br>operator:zz |
| MM 50% group-buying ticket<br>operator:zz |
| view more |

SERVICE PROCESSING METHOD, TERMINAL AND SERVER

The present application is a continuation of International Application No. PCT/CN2016/077363 filed on Mar. 25, 2016, which claims the priority to Chinese Patent Application No. 201510140254.8, titled "SERVICE PROCESSING METHOD, DEVICE, TERMINAL AND SERVER", filed on Mar. 27, 2015 with the State Intellectual Property Office of the People's Republic of China, both of which are incorporated herein by reference in their entireties.

TECHNICAL FIELD

The present disclosure relates to the technical field of internet, specifically to the technical field of internet service processing, and in particular to a service processing method, a terminal and a server.

BACKGROUND

With the development of internet technology, more and more merchants issue paper coupons or electronic coupons to stimulate consumption. The coupon is issued by a merchant and is a voucher of obtaining a corresponding service from the merchant. The coupon may include, but not limited to, a discount card, a discount ticket, a group-buying ticket and a token. A coupon corresponds to a unique code. When a consumer uses a coupon issued by a merchant, the coupon should be verified by the merchant. Coupon verification is the process of verifying validity of a coupon. After the coupon is successfully verified, the merchant provides a service corresponding to the coupon to the consumer. In the conventional technology, a coupon verification service is generally processed manually by a merchant. For example, when a consumer consumes with a coupon, a merchant manually records a code of the coupon with a pen and manually updates a state of the coupon, resulting in a low efficiency of processing a coupon verification service, a high possibility of mistakes due to negligence, and a poor flexibility and intelligence of coupon management.

SUMMARY

A service processing method, a device, a terminal and a server are provided according to embodiments of the present disclosure, to conveniently process coupon verification by using functions provided by a public service account in an internet application, improve the efficiency of processing a coupon verification service, and enhance the flexibility and the intelligence of coupon management.

A service processing method is provided in a first aspect according to an embodiment of the present disclosure, which may include:

obtaining, by a terminal, an operator identifier, when a coupon verification operation is detected on a service page of a public service account;

invoking, by the terminal, a code reading interface of an internet application to which the public service account belongs, to obtain a code of a coupon to be verified;

generating, by the terminal, a coupon verification service request based on the operator identifier and the code of the coupon;

sending, by the terminal, the coupon verification service request to a server, to cause the server to process a coupon verification service based on the operator identifier and the code of the coupon and return a process result to the terminal; and outputting, by the terminal, the process result on the service page of the public service account.

Another service processing method is provided in a second aspect according to an embodiment of the present disclosure, which may include:

receiving, by a server, a coupon verification service request from a terminal, where the coupon verification service request includes an operator identifier of a coupon verification operation detected by the terminal on a service page of a public service account, and a code of a coupon to be verified which is obtained by the terminal by invoking a code reading interface of an internet application to which the public service account belongs;

processing, by the server, a coupon verification service based on the operator identifier and the code of the coupon to obtain a process result; and returning, by the server, the process result to the terminal, to cause the terminal to output the process result on the service page of the public service account.

A service processing device is provided in a third aspect according to an embodiment of the present disclosure, which may include:

an identifier obtaining unit, configured to obtain an operator identifier, when a coupon verification operation is detected on a service page of a public service account;

a code reading unit, configured to invoke a code reading interface of an internet application to which the public service account belongs, to obtain a code of a coupon to be verified;

a request generating unit, configured to generate a coupon verification service request based on the operator identifier and the code of the coupon;

a service requesting unit, configured to send the coupon verification service request to a server, to cause the server to process a coupon verification service based on the operator identifier and the code of the coupon and return a process result to the terminal; and a result outputting unit, configured to output the process result on the service page of the public service account.

A terminal is provided in a fourth aspect according to an embodiment of the present disclosure, which may include the service processing device in the above third aspect.

A service processing device is provided in a fifth aspect according to another embodiment of the present disclosure, which may include:

a service request receiving unit, configured to receive a coupon verification service request from a terminal, where the coupon verification service request includes an operator identifier of a coupon verification operation detected by the terminal on a service page of a public service account, and a code of a coupon to be verified which is obtained by the terminal by invoking a code reading interface of an internet application to which the public service account belongs;

a service processing unit, configured to process a coupon verification service based on the operator identifier and the code of the coupon to obtain a process result; and a feedback unit, configured to return the process result to the terminal, to cause the terminal to output the process result on the service page of the public service account.

A server is provided in a sixth aspect according to an embodiment of the present disclosure, which may include the service processing device in the above fifth aspect.

The embodiments of the present disclosure have the following beneficial effects.

In the embodiments of the present disclosure, a terminal can initiate a coupon verification service request to a server by using a function of processing a coupon verification service provided by a public service account of an internet application, and the request carries an operator identifier and a code of a coupon. The server processes the coupon verification service to obtain a process result and outputs the result. Therefore, convenient processing of coupon verification is achieved, the efficiency of processing a coupon verification service is improved, and the flexibility and intelligence of coupon management are enhanced.

BRIEF DESCRIPTION OF THE DRAWINGS

To illustrate technical solutions according to embodiments of the present disclosure or in the conventional technologies more clearly, drawings to be used in the descriptions of the conventional technologies or the embodiments are described briefly hereinafter. Apparently, the drawings described hereinafter are only for some embodiments of the present disclosure, and other drawings may be obtained by those skilled in the art based on those drawings without creative efforts.

FIG. 4c is a schematic diagram of a code inputting interface according to an embodiment of the present disclosure;

FIG. 4d is a schematic diagram of an outputted process result according to an embodiment of the present disclosure;

DETAILED DESCRIPTION OF THE EMBODIMENTS

Figure 1:
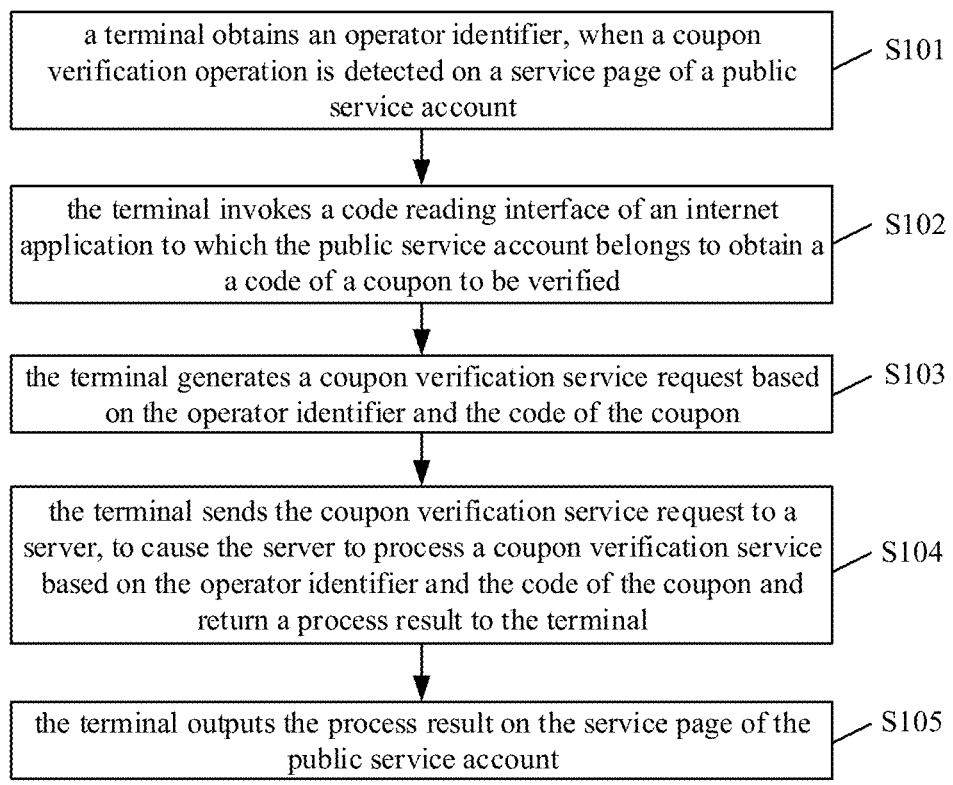
FIG. 1 is a flow chart of a service processing method according to an embodiment of the present disclosure.

Technical solutions of embodiments of the present disclosure are illustrated clearly and completely in conjunction with the following drawings of the embodiments of the present disclosure. The described embodiments are merely a few rather than all of the embodiments of the present disclosure. All other embodiments obtained by those skilled in the art based on the embodiments of the present disclosure shall fall within the protection scope of the present disclosure.

In the embodiments of the present disclosure, a terminal may be a device, such as a notebook computer, a cell phone, a PAD (tablet computer), a vehicle-mounted terminal and an intelligent wearable device. At least one type of internet applications may operate in a terminal, and the application may include, but not limited to, a social application, a game application and an electronic business application. The social application refers to an application which can achieve social functions, and may include, but not limited to, an instant messaging application and an SNS (Social Networking Service) application. A server refers to a background server of an internet application. The server is configured to process various requirements for implementing corresponding functions by the internet application, and may also be configured to manage related information of a user of an internet application, related information of a public service account and interactive messages between users and between the user and the public service account. The related information of the user may include, but not limited to, information, such as accounts, identifiers, passwords and relation chains. The related information of the public service account may include, but not limited to, accounts, identifiers and registration information.

In the embodiments of the present disclosure, the public service account refers to a service account which is opened for merchant users of an internet application by a service provider of the internet application for providing a service processing function to the merchant users. Generally, after following a public service account in an internet application, a merchant user can use the service processing functions provided by the public service account. A coupon is a voucher issued by a merchant user to be used to obtain a corresponding service from the merchant user. The coupon may include, but not limited to, a discount card, a discount ticket, a group-buying ticket and a token. A coupon corresponds to a unique code, and the code of the coupon is generally configured to describe information, such as a type of the coupon and an issuer of the coupon. When a consumer uses a coupon issued by a merchant user, the coupon should be verified by the merchant user. Coupon verification is the process of verifying validity of a coupon. After the coupon is successfully verified, the merchant user provides a service corresponding to the coupon to the consumer.

On the basis of the above description, hereinafter the service processing method according to the embodiments of the present disclosure are described in detail in conjunction with FIG. 1 to FIG. 4.

Reference is made to FIG. 1, which is a flow chart of a service processing method according to an embodiment of the present disclosure. Steps of the service processing method are described from a terminal side in the embodiment. The method may include the following steps S101 to S105.

In step S101, a terminal obtains an operator identifier, when a coupon verification operation is detected on a service page of a public service account.

An internet application may operate in a terminal, and a merchant user may use the internet application through the terminal. In use of the internet application, a merchant user may follow at least one public service account to use service processing functions provided by the followed public service account. For example, if a merchant user follows a public service account corresponding to coupon service processing, the merchant user may verify and manage coupons issued by the merchant user by using coupon service processing functions provided by the public service account through a terminal. In specific implementations, the merchant user may click a coupon verification operation button or select a coupon verification operation option on a service page of a public service account to initiate a coupon verification operation. In the step, the terminal obtains the operator identifier, when the coupon verification operation is detected on the service page of the public service account. The operator identifier may refer to an ID (IDentity, identification number) registered in the internet application by the merchant user.

In step S102, the terminal invokes a code reading interface of the internet application to which the public service account belongs, to obtain a code of a coupon to be verified.

The code reading interface refers to a plug-in or a tool which is installed in the internet application to which the public service account belongs and is capable of obtaining the code of the coupon. The code reading interface may include, but not limited to, a code scanning interface which can scan coupon codes, such as a two-dimensional code scanning tool and a bar code description plug-in, or a code inputting interface which can receive an inputted coupon code, such as a code inputting window and a code inputting box. In the step, the terminal may invoke the code reading interface of the internet application to which the public service account belongs, to obtain the code of the coupon to be verified.

In step S103, the terminal generates a coupon verification service request based on the operator identifier and the code of the coupon.

In the step, the terminal may encapsulate the operator identifier and the code of the coupon according to a communication protocol between the terminal and a server to generate the coupon verification service request.

In step S104, the terminal sends the coupon verification service request to a server, to cause the server to process a coupon verification service based on the operator identifier and the code of the coupon and return a process result to the terminal.

The terminal may establish a wired or wireless communication connection with the server and may send the coupon verification service request to the server via the communication connection with the server. After receiving the coupon verification service request, the server may process, based on the operator identifier and the code of the coupon, the coupon verification service, which includes verifying operation authority of an operator, authenticating validity of the code of the coupon, completing coupon verification and the like, and generate a process result. The process result may include successful verification and failed verification. The process result of the failed verification carries a failure reason. The failure reason may include, but not limited to, any one or more of reasons that the operator has no operation authority, a use time of the coupon to be verified is wrong, the code of the coupon is invalid and the code of the coupon is wrong. The server returns the process result to the terminal via the communication connection with the server.

In step S105, the terminal outputs the process result on the service page of the public service account.

The terminal outputs the process result on the service page of the public service account, which makes an operator (such as a merchant user) intuitively aware of a processing situation of the coupon verification service on the service page of the public service account.

In the embodiment of the present disclosure, a terminal can initiate a coupon verification service request to a server by using a function of processing a coupon verification service provided by a public service account of an internet application, and the request carries an operator identifier and a code of a coupon. The server processes the coupon verification service to obtain a process result and outputs the result. Therefore, convenient processing of coupon verification is achieved, the efficiency of processing a coupon verification service is improved, and the flexibility and the intelligence of coupon management are enhanced.

Figure 2:
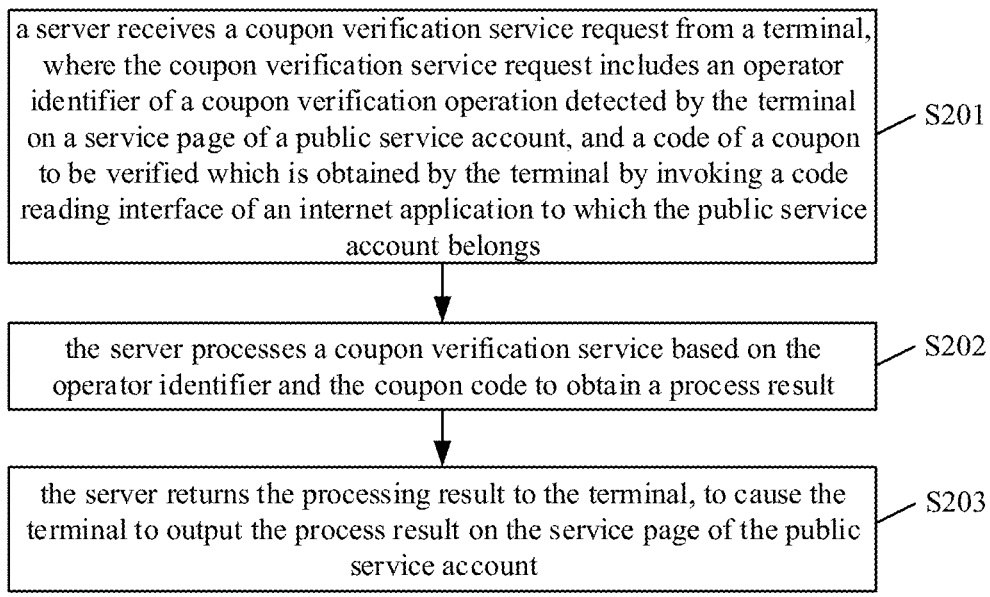
FIG. 2 is a flow chart of a service processing method according to another embodiment of the present disclosure.

Reference is made to FIG. 2, which is a flow chart of a service processing method according to another embodiment of the present disclosure. Steps of the service processing method are described from a server side in the embodiment. The method may include the following steps S201 to S203.

In step S201, a server receives a coupon verification service request from a terminal, where the coupon verification service request includes an operator identifier of a coupon verification operation detected by the terminal on a service page of a public service account, and a code of a coupon to be verified which is obtained by the terminal by invoking a code reading interface of an internet application to which the public service account belongs.

In specific implementations, a merchant user may click a coupon verification operation button or select a coupon verification operation option on the service page of the public service account to initiate a coupon verification operation. When a coupon verification operation is detected on the service page of the public service account, the terminal obtains the operator identifier and invokes the code reading interface of the internet application to which the public service account belongs, to obtain the code of the coupon to be verified. Further, the terminal generates the coupon verification request based on the operator identifier and the code of the coupon and sends the request to the server. In the step, the server may establish a wired or wireless communication connection with the terminal and receive the coupon verification request from the terminal via the communication connection with the terminal.

In step S202, the server processes a coupon verification service based on the operator identifier and the code of the coupon and obtains a process result.

The processing the coupon verification service by the server may include: verifying operation authority of an operator, authenticating validity of the code of the coupon, completing coupon verification and the like. The process result may include successful verification and failed verification. The process result of the failed verification carries a failure reason. The failure reason may include, but not limited to, any one or more of reasons that the operator has no operation authority, a use time of the coupon to be verified is wrong, the code of the coupon is invalid and the code of the coupon is wrong.

In step S203, the server returns the process result to the terminal, to cause the terminal to output the process result on the service page of the public service account.

In the step, the server may return the process result to the terminal via the communication connection with the terminal. After the server returns the process result to the terminal, the terminal outputs the process result on the service page of the public service account, which makes an operator (such as a merchant user) intuitively aware of a processing situation of the coupon verification service on the service page of the public service account.

In the embodiment of the present disclosure, a terminal can initiate a coupon verification service request to a server by using a function of processing a coupon verification service provided by a public service account of an internet application, and the request carries an operator identifier and a code of a coupon. The server processes the coupon verification service to obtain a process result and outputs the result. Therefore, convenient processing of coupon verification is achieved, the efficiency of processing a coupon verification service is improved, and the flexibility and the intelligence of coupon management are enhanced.

Figure 3:
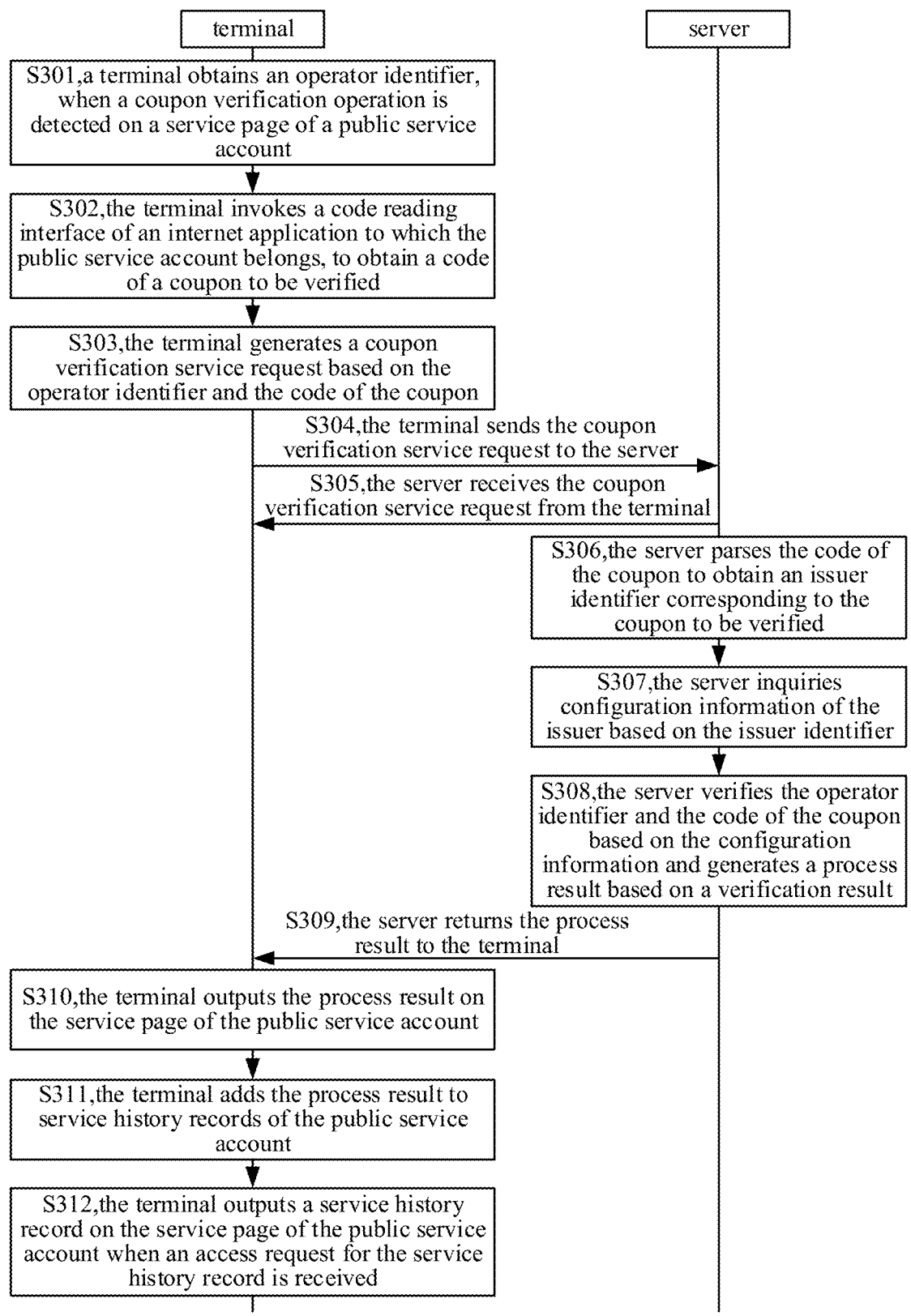
FIG. 3 is a flow chart of a service processing method according to another embodiment of the present disclosure.

Reference is made to FIG. 3, which is a flow chart of a service processing method according to another embodiment of the present disclosure. Steps of the service processing method are described in the embodiment regarding an interaction between a terminal and a server. The method may include the following steps S301 to S312.

In step S301, a terminal obtains an operator identifier, when a coupon verification operation is detected on a service page of a public service account.

Figure 4A:
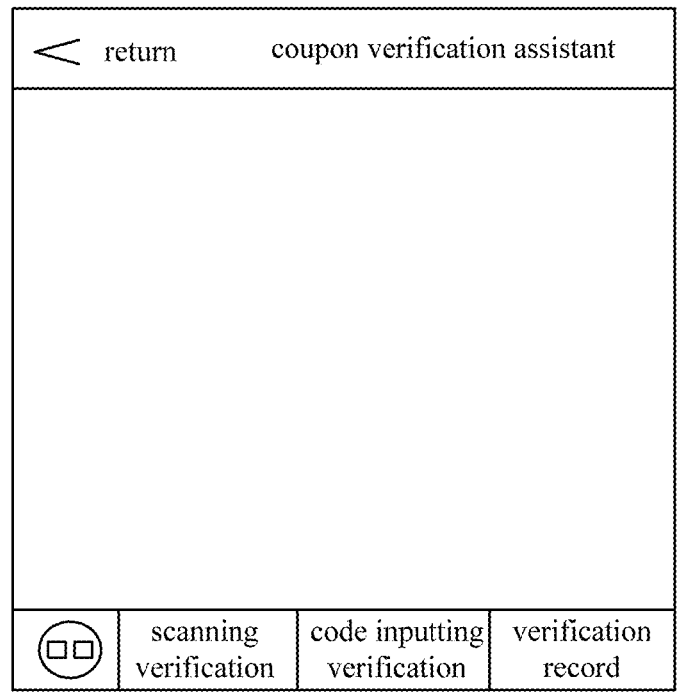
FIG. 4a is a schematic diagram of a service page of a public service account according to an embodiment of the present disclosure.

An internet application may operate in a terminal, and a merchant user may use the internet application through the terminal. In use of the internet application, a merchant user may follow at least one public service account to use service processing functions provided by the followed public service account. Reference is made to FIG. 4a, which is a schematic diagram of a service page of a public service account according to an embodiment of the present disclosure. As shown in FIG. 4a, if a merchant user follows a public service account corresponding to a coupon verification assistant, the merchant user may verify coupons issued by the merchant user by using a function of processing a coupon verification service provided by the public service account through a terminal.

Reference is made to FIG. 4a again. A merchant user may click a scanning verification button or select a code inputting verification option on the service page of the public service account shown in FIG. 4a to initiate a coupon verification operation. In the step, the terminal obtains the operator identifier, when the coupon verification operation is detected on the service page of the public service account. The operator identifier may refer to an ID registered in the internet application by the merchant user.

In step S302, the terminal invokes a code reading interface of an internet application to which the public service account belongs, to obtain a code of a coupon to be verified.

The code reading interface refers to a plug-in or a tool which is installed in the internet application to which the public service account belongs and is capable of obtaining the code of the coupon. The code reading interface may include, but not limited to, a code scanning interface which can scan coupon codes, such as a two-dimensional code scanning tool and a bar code description plug-in, or a code inputting interface which can receive an inputted coupon code, such as a code inputting window and a code inputting box. In the step, the terminal may invoke the code reading interface of the internet application to which the public service account belongs, to obtain the code of the coupon to be verified.

Figure 4B:
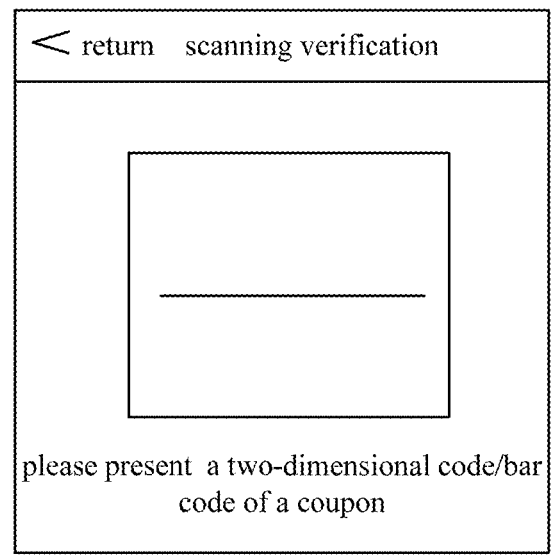
FIG. 4b is a schematic diagram of a code scanning interface according to an embodiment of the present disclosure.

As shown in FIG. 4a, if a merchant user clicks the scanning verification button on the service page of the public service account to initiate a coupon verification operation, as an implementation of the step S302, the terminal invokes the code scanning interface of the internet application to which the public service account belongs, scans a graphic code on the coupon to be verified via the code scanning interface, and obtains the code of the coupon to be verified. Reference is made to FIG. 4b, which is a schematic diagram of a code scanning interface according to an embodiment of the present disclosure. A graphic code, such as a two-dimensional code and a bar code on a coupon may be scanned via the code scanning interface shown in FIG. 4b, and the code of the coupon is obtained by parsing the graphic code.

As shown in FIG. 4a, if a merchant user selects the code inputting verification option on the service page of the public service account to initiate a coupon verification operation, as an implementation of the step S302, the terminal invokes the code inputting interface of the internet application to which the public service account belongs and receives the code of the coupon to be verified which is inputted by the operator via the code inputting interface. Reference is made to FIG. 4c, which is a schematic diagram of a code inputting interface according to an embodiment of the present disclosure. A code of a coupon manually inputted by the merchant user may be obtained via the code inputting interface shown in FIG. 4c.

In step S303, the terminal generates a coupon verification service request based on the operator identifier and the code of the coupon.

In the step, the terminal may encapsulate the operator identifier and the code of the coupon according to a communication protocol between the terminal and a server and generate the coupon verification service request.

In step S304, the terminal sends the coupon verification service request to the server. The terminal may establish a wired or wireless communication connection with the server and may send the coupon verification service request to the server via the communication connection with the server.

In step S305, the server receives the coupon verification service request from the terminal. The server may receive the coupon verification service request from the terminal via the communication connection with the terminal.

In step S306, the server parses the code of the coupon to obtain an issuer identifier corresponding to the coupon to be verified.

A coupon corresponds to a unique code, and the code of the coupon may be generally configured to describe information, such as a type of a coupon and an issuer of the coupon. In the step, the server may parse the code of the coupon based on a coupon coding and decoding rule to obtain the issuer identifier of the coupon, namely, an identifier of a merchant user who issues the coupon.

In step S307, the server inquiries configuration information of the issuer based on the issuer identifier. The configuration information includes an operation authority list and a valid coupon list. The operation authority list includes at least one target identifier having a coupon verification operation authority, and the valid coupon list includes at least one available valid coupon code.

A merchant user may configure various kinds of information in the public service account. The configuration includes configuring operation authority. For example, a merchant user employs multiple clerks and may grant authority of coupon verification operation to some clerks, and the merchant user may configure identifiers of the granted clerks to be the target identifier having the coupon verification operation authority. The configuration may further include managing and configuring coupons issued by the merchant user. For example, a merchant user issue a hundred coupons in total and may configure a coupon issuing list. The coupon issuing list includes coupon codes of the issued hundred coupons, and further, valid coupons are determined according to states of the hundred coupons (such as being expired, used, unused). It may be understood that, the valid coupon refers to coupons which have not been used within the period of validity. The merchant user may configure a valid coupon list, and the valid coupon list includes valid coupon codes. The public service account stores the configuration information and the identifier of the merchant user in an associated manner. In the step, the server may obtain the configuration information of the issuer from a storage space of the public service account based on the issuer identifier (namely, an identifier of a merchant user).

In step S308, the server verifies the operator identifier and the code of the coupon based on the configuration information and generates the process result based on a verification result.

The step S308 may include the following steps A to D.

In step A, the server determines whether the operator identifier is a target identifier in the operation authority list.

In step B, in a case that the operator identifier is not a target identifier in the operation authority list, the server generates the process result of the failed verification. The step A and the step B are performed to verify the operation authority of an operator, which can ensure the security of coupon verification operations.

In step C, in a case that the operator identifier is a target identifier in the operation authority list, the server determines whether the code of the coupon is a valid coupon code in the valid coupon list.

In step D, in a case that the code of the coupon is a valid coupon code in the valid coupon list, the server generates the process result of the successful verification; and in a case that the code of the coupon is not a valid coupon code in the valid coupon list, the server generates the process result of the failed verification.

In the above steps A to D, if the server generates the process result of the failed verification, a failure reason is carried in the process result. Specifically, in the step B, in a case that the operator identifier is not a target identifier in the operation authority list, the server may obtain a failure reason that the operator has no operation authority. In the step D, in a case that the code of the coupon is not a valid coupon code in the valid coupon list, the server may check whether the code of the coupon is in a correct format, and if the code of the coupon is not in the correct format, a failure reason that the code of the coupon is wrong is obtained; or the server may inquire a coupon issuing list and determine a state of the code of the coupon, and in a case that the coupon is in an expired or used state, the server may regard the inquired state as the failure reason.

It should be noted that, after completing the coupon verification processing and generating the process result, the server may further update the valid coupon list and the coupon state according to the verification process result, to ensure the accuracy of subsequent service processing.

In step S309, the server returns the process result to the terminal.

In step S310, the terminal outputs the process result on the service page of the public service account.

Figure 4E:
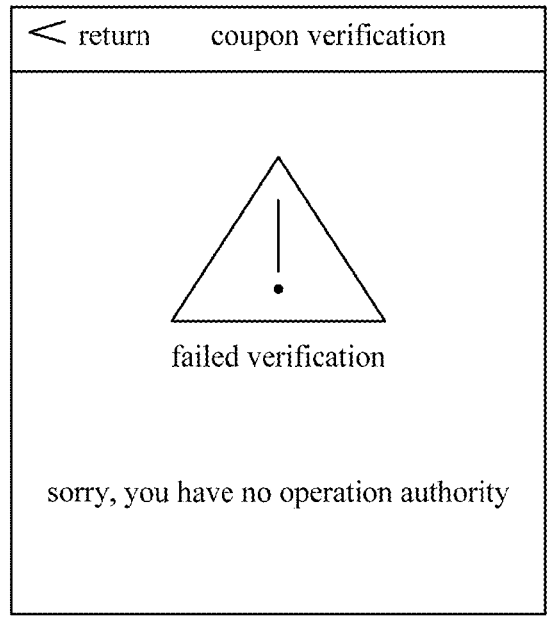
FIG. 4e is a schematic diagram of an outputted process result according to another embodiment of the present disclosure.
Figure 4F:
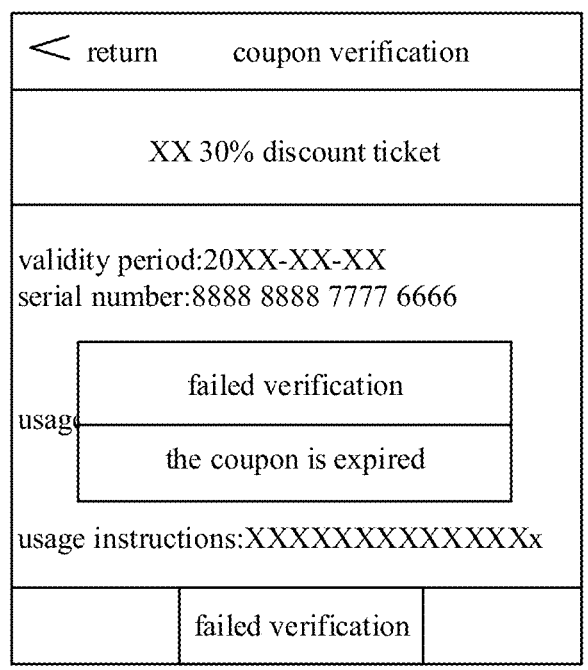
FIG. 4f is a schematic diagram of an outputted process result according to another embodiment of the present disclosure.

Reference is made to FIG. 4d to FIG. 4f, which are schematic diagrams of outputted process results according to an embodiment of the present disclosure. As shown in FIG. 4d to FIG. 4f, the terminal outputs the process result on the service page of the public service account, which makes an operator (such as a merchant user) intuitively aware of a processing situation of the coupon verification service on the service page of the public service account.

In step S311, the terminal adds the process result to service history records of the public service account.

In step S312, when an access request for a service history record is received, the terminal outputs the service history record on the service page of the public service account.

Figures 4G, 5:
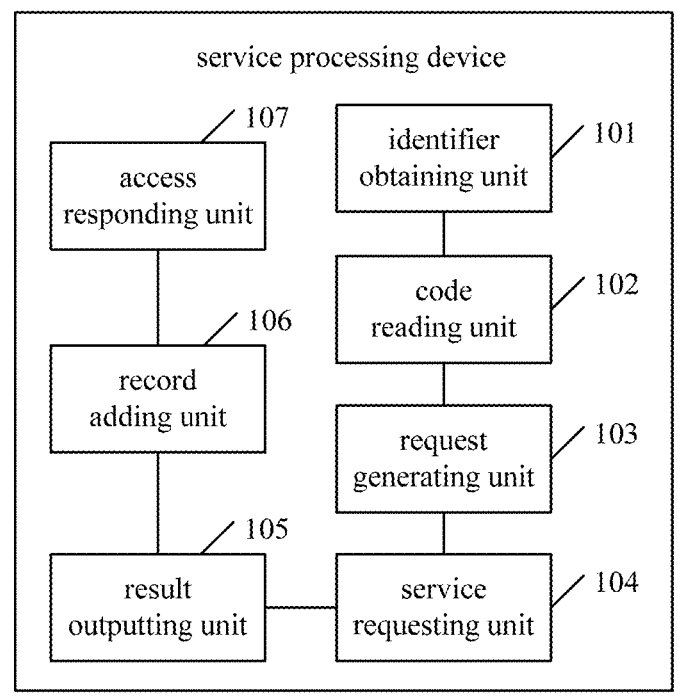
FIG. 4g is a schematic diagram of a service history record according to an embodiment of the present disclosure.
FIG. 5 is a schematic structural diagram of a service processing device according to an embodiment of the present disclosure.

The terminal may provide an access interface of the service history records. For example, a verification recording button shown in FIG. 4a is an access interface of the service history records provided by the terminal. The merchant user may click the verification recording button shown in FIG. 4a on the service page of the public service account to initiate an access request. Reference is made to FIG. 4g, which is a schematic diagram of a service history record according to an embodiment of the present disclosure. When the access request for a service history record is received, the terminal displays the service history record on the service page of the public service account, which is convenient for merchant users to browse the service history records.

In the embodiment of the present disclosure, a terminal can initiate a coupon verification service request to a server by using a function of processing a coupon verification service provided by a public service account of an internet application, and the request carries an operator identifier and a code of a coupon. The server processes the coupon verification service to obtain a process result and outputs the result. Therefore, convenient processing of coupon verification is achieved, the efficiency of processing a coupon verification service is improved, and the flexibility and the intelligence of coupon management are enhanced.

Hereinafter a service processing device is described in detail according to an embodiment of the present disclosure in conjunction with FIG. 5 to FIG. 7. The service processing device shown in FIG. 5 to FIG. 7 may be an internet application in a terminal, which may operate in a terminal to be applied to the above method shown in FIG. 1 to FIG. 4.

Reference is made to FIG. 5, which is a schematic structural diagram of a service processing device according to an embodiment of the present disclosure. The device may include an identifier obtaining unit 101, a code reading unit 102, a request generating unit 103, a service requesting unit 104 and a result outputting unit 105.

The identifier obtaining unit 101 is configured to obtain an operator identifier, when a coupon verification operation is detected on a service page of a public service account.

An internet application may operate in a terminal, and a merchant user may use the internet application through the terminal. In use of the internet application, a merchant user may follow at least one public service account to use service processing functions provided by the followed public service account. For example, if a merchant user follows a public service account corresponding to coupon service processing, the merchant user may verify and manage coupons issued by the merchant user by using coupon service processing functions provided by the public service account through a terminal. In specific implementations, the merchant user may click a coupon verification operation button or select a coupon verification operation option on a service page of a public service account to initiate a coupon verification operation. The identifier obtaining unit 101 obtains the operator identifier, when the coupon verification operation is detected on the service page of the public service account. The operator identifier may refer to an ID registered in the internet application by the merchant user.

The code reading unit 102 is configured to invoke a code reading interface of an internet application to which the public service account belongs, to obtain a code of a coupon to be verified.

The code reading interface refers to a plug-in or a tool which is installed in the internet application to which the public service account belongs and is capable of obtaining the code of the coupon. The code reading interface may include, but not limited to, a code scanning interface which can scan coupon codes, such as a two-dimensional code scanning tool and a bar code description plug-in, or a code inputting interface which can receive an inputted coupon code, such as a code inputting window and a code inputting box. The code reading unit 102 may invoke the code reading interface of the internet application to which the public service account belongs, to obtain the code of the coupon to be verified.

The request generating unit 103 is configured to generate a coupon verification service request based on the operator identifier and the code of the coupon.

The request generating unit 103 may encapsulate the operator identifier and the code of the coupon according to a communication protocol between the terminal and a server and generate the coupon verification service request.

The service requesting unit 104 is configured to send the coupon verification service request to a server, to cause the server to process a coupon verification service based on the operator identifier and the code of the coupon and return a process result to the terminal.

The terminal may establish a wired or wireless communication connection with the server. The service requesting unit 104 may send the coupon verification service request to the server via the communication connection with the server. After receiving the coupon verification service request, the server may process, based on the operator identifier and the code of the coupon, the coupon verification service, which includes verifying operation authority of an operator, authenticating validity of the code of the coupon, completing coupon verification and the like, and generate a process result. The process result may include successful verification and failed verification. The process result of the failed verification carries a failure reason. The failure reason may include, but not limited to, any one or more of reasons that the operator has no operation authority, a use time of the coupon to be verified is wrong, the code of the coupon is invalid and the code of the coupon is wrong. The server returns the process result to the terminal via the communication connection with the server.

The result outputting unit 105 is configured to output the process result on the service page of the public service account.

The result outputting unit 105 outputs the process result on the service page of the public service account, which makes an operator (such as a merchant user) intuitively aware of a processing situation of the coupon verification service on the service page of the public service account.

Reference is made to FIG. 5 again. The device may further include a record adding unit 106 and an access responding unit 107.

The record adding unit 106 is configured to add the process result to service history records of the public service account.

The access responding unit 107 is configured to output a service history record on the service page of the public service account, when an access request for the service history record is received.

The terminal may provide an access interface of the service history record, and a merchant user may click the access interface of a service history record on the service page of the public service account to initiate an access request. When the access request for a service history record is received, the access responding unit 107 displays the service history record on the service page of the public service account, which is convenient for merchant users to browse the service history record.

In the embodiment of the present disclosure, a terminal can initiate a coupon verification service request to a server by using a function of a processing coupon verification service provided by a public service account of an internet application, and the request carries an operator identifier and a code of a coupon. The server processes the coupon verification service to obtain a process result and outputs the result. Therefore, convenient processing of coupon verification is achieved, the efficiency of processing a coupon verification service processing is improved, and the flexibility and the intelligence of coupon management are enhanced.

Figure 6:
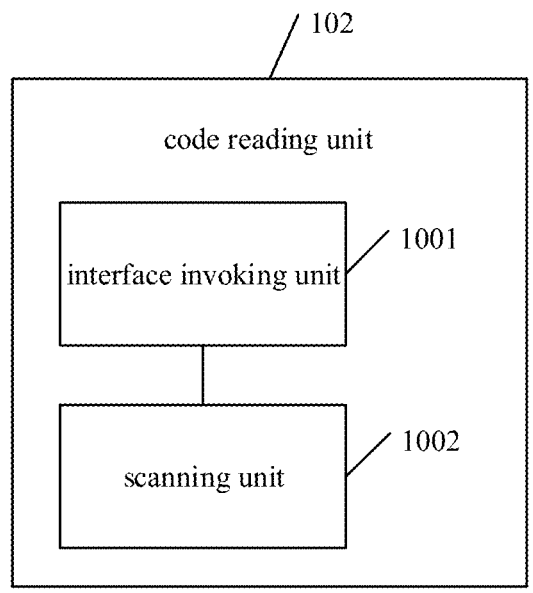
FIG. 6 is a schematic structural diagram of a code reading unit shown in FIG. 5 according to an embodiment.

Reference is made to FIG. 6, which is a schematic structural diagram of a code reading unit shown in FIG. 5 according to an embodiment. The code reading unit 102 may include an interface invoking unit 1001 and a scanning unit 1002.

The interface invoking unit 1001 is configured to invoke a code scanning interface of an internet application to which the public service account belongs.

The embodiment is illustrated with FIG. 4*a* and FIG. 4*b*. If a merchant user clicks a scanning verification button on the service page of the public service account to initiate a coupon verification operation, the interface invoking unit 1001 invokes the code scanning interface of the internet application to which the public service account belongs.

The scanning unit 1002 is configured to scan a graphic code on a coupon to be verified via the code scanning interface to obtain a code of the coupon to be verified.

The scanning unit 1002 scans the graphic code on the coupon to be verified via the code scanning interface to obtain the code of the coupon to be verified. Reference is made to FIG. 4*b*. A graphic code, such as a two-dimensional code and a bar code on a coupon may be scanned via the code scanning interface shown in FIG. 4*b*, and the code of the coupon is obtained by parsing the graphic code.

In the embodiment of the present disclosure, a terminal can initiate a coupon verification service request to a server by using a function of processing a coupon verification service provided by a public service account of an internet application, and the request carries an operator identifier and a code of a coupon. The server processes the coupon verification service to obtain a process result and outputs the result. Therefore, convenient processing of coupon verification is achieved, the efficiency of processing a coupon verification service is improved, and the flexibility and the intelligence of coupon management are enhanced.

Figure 7:
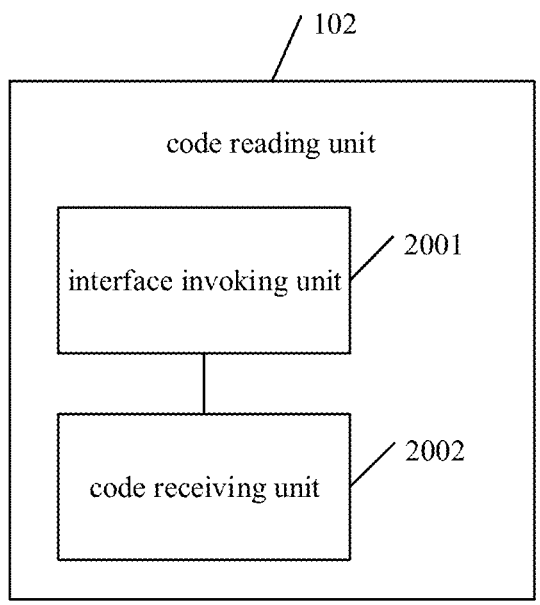
FIG. 7 is a schematic structural diagram of a code reading unit shown in FIG. 5 according to another embodiment.

Reference is made to FIG. 7, which is a schematic structural diagram of a code reading unit shown in FIG. 5 according to another embodiment. The code reading unit 102 may include an interface invoking unit 2001 and a code receiving unit 2002.

The interface invoking unit 2001 is configured to invoke a code inputting interface of an internet application to which the public service account belongs.

The embodiment may be illustrated in conjunction with FIG. 4a and FIG. 4c. If a merchant user clicks a code outputting verification button on the service page of the public service account to initiate a coupon verification operation, the interface invoking unit 2001 invokes the code inputting interface of the internet application to which the public service account belongs.

The code receiving unit 2002 is configured to obtain a code of a coupon to be verified which is inputted by an operator via the code inputting interface.

The code receiving unit 2002 receives the code of the coupon to be verified which is inputted by an operator via the code inputting interface. Reference is made to FIG. 4c. A code of a coupon manually inputted by the merchant user may be obtained via the code inputting interface shown in FIG. 4c.

In the embodiment of the present disclosure, a terminal can initiate a coupon verification service request to a server by using a function of processing a coupon verification service provided by a public service account of an internet application, and the request carries an operator identifier and a code of a coupon. The server processes the coupon verification service to obtain a process result and outputs the result. Therefore, convenient processing of coupon verification is achieved, the efficiency of processing a coupon verification service is improved, and the flexibility and the intelligence of coupon management are enhanced.

In the above embodiments, the public service account refers to a service account which is opened for merchant users of an internet application by a service provider of the internet application for providing a service processing function to the merchant users. Alternatively, in the other embodiments of the present disclosure, the public service account may be a service account which is opened for consumers of an internet application by a service provider of the internet application for providing a service processing function to the consumers. In this case, a consumer may generally register in an internet application and obtain a public service account provided by the internet application. After logging in the public service account, the consumer may verify and manage a coupon by himself, instead of processing by a merchant user.

Figure 8:
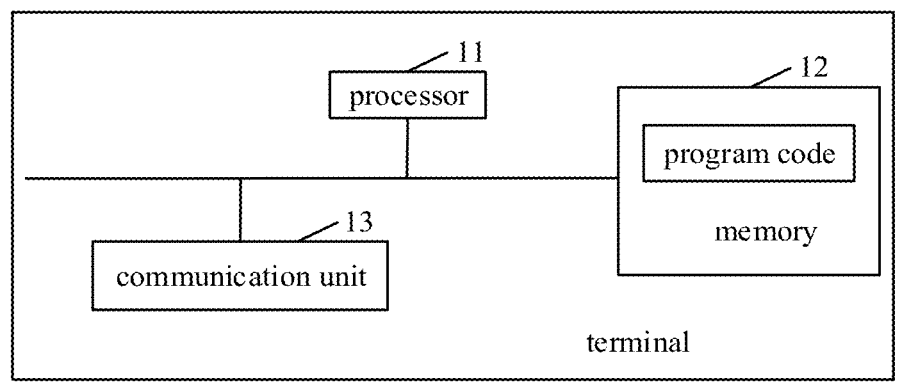
FIG. 8 is a schematic structural diagram of a terminal according to an embodiment of the present disclosure.

Reference is made to FIG. 8. A terminal is further provided according to an embodiment of the present disclosure. The terminal may include components, such as a processor 11, a memory 12 and a communication unit 13. The components communicate via one or more buses. It may be understood by those skilled in the art that, a structure of the terminal shown in FIG. 8 should not to be construed as limiting the present disclosure. The structure of the terminal may be a bus structure or a star structure and may include more or less components than the structure shown in FIG. 8, or a combination of some components, or different arrangements of components.

The processor 11 is a control center of the terminal and is connected to various parts of the terminal via various interfaces and lines. The processor 11 executes various functions and/or processes data of the terminal by running or executing program codes and/or modules stored in the memory 12, and calling data stored in the memory 12. The processor 11 may be formed by an integrated circuit (shortened as IC), which may be a single packaged IC, or multiple connected packaged ICs having the same or different functions. For example, the processor 11 may include only one central processing unit (shortened as CPU), and may also include a combination of a CPU, a digital signal processor (shortened as DSP), a graphic processing unit (shortened as GPU) and a control chip (such as a baseband chip) in a communication unit. In the embodiment of the present disclosure, CPU may include a single operation core or multiple operation cores.

The memory 12 may be configured to store program codes and modules. The processor 11 executes various functional applications of the terminal and performs data processing by running the program codes and modules stored in the memory 12. The memory 12 mainly includes a program storage area and a data storage area. The program storage area may store an operating system and program codes required by at least one function, such as program codes for service processing. The data storage area may store data created in accordance with use of the terminal.

The communication unit 13 is configured to establish a communication channel to enable a terminal to be connected to a server via the communication channel. The communication unit 13 may include a wireless communication module, such as, a wireless local area network (shortened as wireless LAN) module, a Bluetooth module, a near field communication (shortened as NFC) module, a base band module, and a wired communication module, such as, Ethernet, a universal serial bus (shortened as USB), a lightning interface (currently applied to equipment such as iPhone5, iPhone5s or iPhone5c).

In the terminal shown in FIG. 8, the processor 11 may invoke the program codes stored in the memory 12 to execute the following operations:

obtaining an operator identifier, when a coupon verification operation is detected on a service page of a public service account;

invoking a code reading interface of an internet application to which the public service account belongs, to obtain a code of a coupon to be verified;

generating a coupon verification service request based on the operator identifier and the code of the coupon;

sending the coupon verification service request to a server, to cause the server to process a coupon verification service based on the operator identifier and the code of the coupon and return a process result to the terminal; and outputting the process result on the service page of the public service account.

The invoking the code reading interface of the internet application to which the public service account belongs to obtain the code of the coupon to be verified includes: invoking the code scanning interface of the internet application to which the public service account belongs, to scan a graphic code on the coupon to be verified via the code scanning interface and obtain the code of the coupon to be verified; or invoking the code inputting interface of the internet application to which the public service account belongs, to receive the code of the coupon to be verified which is inputted by an operator via the code inputting interface.

The process result includes successful verification and failed verification. The process result of the failed verification carries a failure reason. The failure reason includes any one or more of reasons that the operator has no operation authority, a use time of the coupon to be verified is wrong, the code of the coupon is invalid and the code of the coupon is wrong.

The processor 11 may also invoke the program codes stored in the memory 12 and execute the following steps: adding the process result into service history records of the public service account, after the process result is outputted on the service page of the public service account; and outputting a service history record on the service page of the public service account, when an access request for the service history record is received.

In the embodiment of the present disclosure, a terminal can initiate a coupon verification service request to a server by using a function of processing a coupon verification service provided by a public service account of an internet application, and the request carries an operator identifier and a code of a coupon. The server processes the coupon verification service to obtain a process result and outputs the result. Therefore, convenient processing of coupon verification is achieved, the efficiency of processing a coupon verification service is improved, and the flexibility and the intelligence of coupon management are enhanced.

Hereinafter a service processing device is described in detail according to another embodiment of the present disclosure in conjunction with FIG. 9 to FIG. 11. The service processing device shown in FIG. 9 to FIG. 11 may operate in a server to be applied to the above methods shown in FIG. 1 to FIG. 4.

Figure 9:
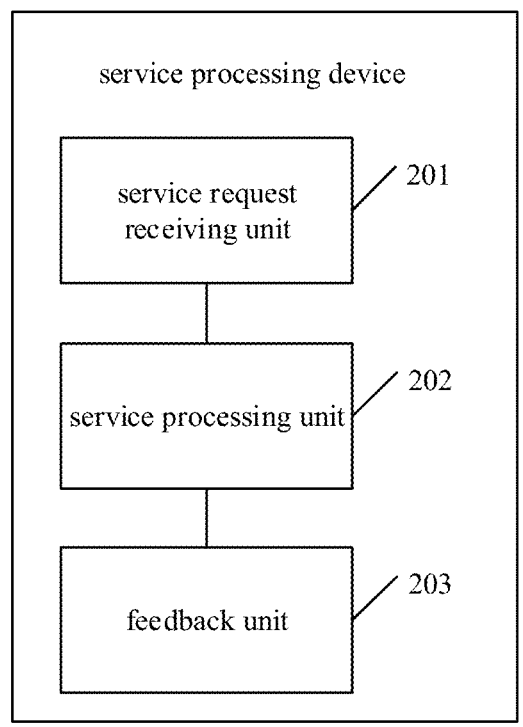
FIG. 9 is a schematic structural diagram of a service processing device according to another embodiment of the present disclosure.

Reference is made to FIG. 9, which is a schematic structural diagram of a service processing device according to another embodiment of the present disclosure. The device may include a service request receiving unit 201, a service processing unit 202 and a feedback unit 203.

The service request receiving unit 201 is configured to receive a coupon verification service request from a terminal. The coupon verification service request includes an operator identifier of a coupon verification operation detected by the terminal on a service page of a public service account, and a code of a coupon to be verified which is obtained by the terminal by invoking a code reading interface of an internet application to which the public service account belongs.

In specific implementations, a merchant user or a consumer may click a coupon verification operation button or select a coupon verification operation option on the service page of the public service account to initiate a coupon verification operation. When a coupon verification operation is detected on the service page of the public service account, the terminal obtains the operator identifier and invokes the code reading interface of the internet application to which the public service account belongs, to obtain the code of the coupon to be verified. Further, the terminal generates the coupon verification request based on the operator identifier and the code of the coupon and sends the request to the server. The server may establish a wired or wireless communication connection with the terminal. The service request receiving unit 201 may receive the coupon verification request from the terminal via the communication connection with the terminal.

The service processing unit 202 is configured to process a coupon verification service based on the operator identifier and the code of the coupon and obtain a process result.

The processing the coupon verification service by the service processing unit 202 may include: verifying operation authority of an operator, authenticating validity of the code of the coupon, completing coupon verification and the like. The process result may include successful verification and failed verification. The process result of the failed verification carries a failure reason. The failure reason may include, but not limited to, any one or more of reasons that the operator has no operation authority, a use time of the coupon to be verified is wrong, the code of the coupon is invalid and the code of the coupon is wrong.

The feedback unit 203 is configured to return the process result to the terminal, to cause the terminal to output the process result on the service page of the public service account.

The feedback unit 203 returns the process result to the terminal via the communication connection between the feedback unit 203 and the terminal. After the feedback unit 203 returns the process result to the terminal, the terminal outputs the process result on the service page of the public service account, which makes an operator (such as a merchant user) intuitively aware of a processing situation of the coupon verification service on the service page of the public service account.

In the embodiment of the present disclosure, a terminal can initiate a coupon verification service request to a server by using a function of processing a coupon verification service provided by a public service account of an internet application, and the request carries an operator identifier and a code of a coupon. The server processes the coupon verification service to obtain a process result and outputs the result. Therefore, convenient processing of coupon verification is achieved, the efficiency of processing a coupon verification service is improved, and the flexibility and the intelligence of coupon management are enhanced.

Figure 10:
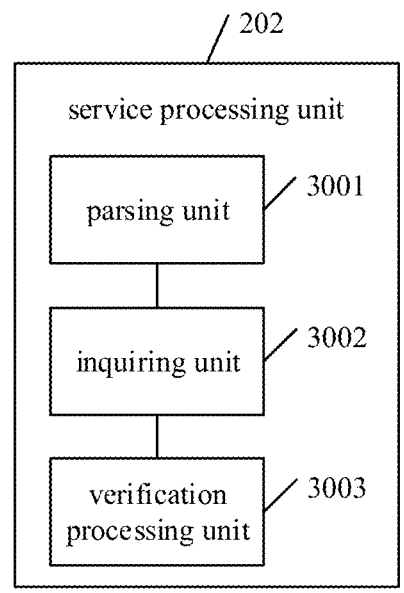
FIG. 10 is a schematic structural diagram of a service processing unit shown in FIG. 9 according to an embodiment.

Reference is made to FIG. 10, which is a schematic structural diagram of a service processing unit shown in FIG. 9 according to an embodiment. The service processing unit 202 may include a parsing unit 3001, an inquiring unit 3002 and a verification processing unit 3003.

The parsing unit 3001 is configured to parse a code of a coupon to obtain an issuer identifier corresponding to the coupon to be verified.

A coupon corresponds to a unique code, and the code of the coupon is generally configured to describe information, such as a type of a coupon and an issuer of the coupon. The parsing unit 3001 may parse the code of the coupon based on a coupon coding and decoding rule to obtain the issuer identifier of the coupon, namely, an identifier of a merchant user who issues the coupon.

The inquiring unit 3002 is configured to inquire configuration information of the issuer based on the issuer identifier. The configuration information includes an operation authority list and a valid coupon list. The operation authority list includes at least one target identifier having a coupon verification operation authority, and the valid coupon list includes at least one available valid coupon code.

A merchant user may configure various kinds of information in the public service account. The configuration includes configuring operation authority. For example, a merchant user employs multiple clerks and may grant authority of coupon verification operation to some clerks, and the merchant user may configure identifiers of the granted clerks to be the target identifier having the coupon verification operation authority. The configuration may further include managing and configuring coupons issued by the merchant user. For example, a merchant user issue a hundred coupons in total and may configure a coupon issuing list. The coupon issuing list includes coupon codes of the issued hundred coupons, and further, valid coupons are determined according to states of the hundred coupons (such as being expired, used, unused). It may be understood that, the valid coupon refers to coupons which have not been used within the period of validity. The merchant user may configure a valid coupon list, and the valid coupon list includes valid coupon codes. The public service account stores the configuration information and the identifier of the merchant user in an associated manner. The inquiring unit 3002 may obtain the configuration information of the issuer from a storage space of the public service account based on the issuer identifier (namely, an identifier of a merchant user).

The verification processing unit 3003 is configured to verify the operator identifier and the code of the coupon based on the configuration information and to generate the process result based on a verification result.

In the embodiment of the present disclosure, a terminal can initiate a coupon verification service request to a server by using a function of processing a coupon verification service provided by a public service account of an internet application, and the request carries an operator identifier and a code of a coupon. The server processes the coupon verification service to obtain a process result and outputs the result. Therefore, convenient processing of coupon verification is achieved, the efficiency of processing a coupon verification service is improved, and the flexibility and the intelligence of coupon management are enhanced.

Figure 11:
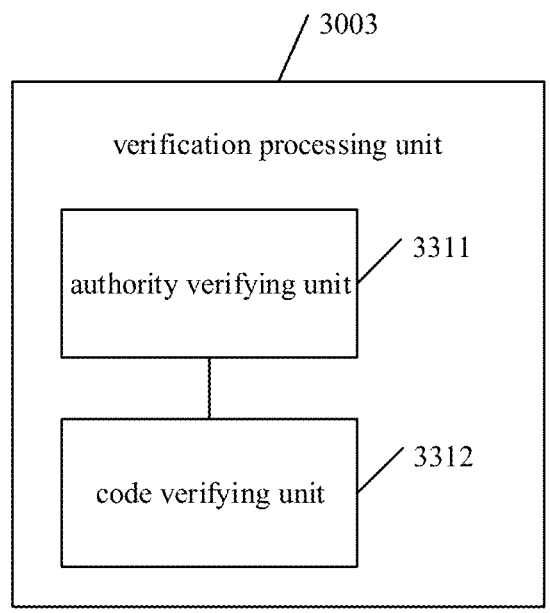
FIG. 11 is a schematic structural diagram of a verification processing unit shown in FIG. 10 according to an embodiment.

Reference is made to FIG. 11, which is a schematic structural diagram of a verification processing unit shown in FIG. 10 according to an embodiment. The verification processing unit 3003 may include an authority verifying unit 3311 and a code verifying unit 3312.

The authority verifying unit 3311 is configured to determine whether the operator identifier is a target identifier in the operation authority list, and generate the process result of the failed verification in a case that the operator identifier is not a target identifier in the operation authority list.

In the embodiment, if the operator identifier is not a target identifier in the operation authority list, the authority verifying unit 3311 obtains a failure reason that the operator has no operation authority, and causes the failure reason to be carried in the process result of the failed verification.

The code verifying unit 3312 is configured to determine whether the code of the coupon is a valid coupon code in the valid coupon list in a case that the operator identifier is a target identifier in the operation authority list, generate the process result of the successful verification in a case that the code of the coupon is a valid coupon code in the valid coupon list, and generate the process result of the failed verification in a case that the code of the coupon is not a valid coupon code in the valid coupon list.

If the code of the coupon is not a valid coupon code in the valid coupon list, the code verifying unit 3312 may check whether the code of the coupon is in a correct format, and if the code of the coupon is not in the correct format, a failure reason that the code of the coupon is wrong is obtained. Alternatively, the code verifying unit 3312 may inquire a coupon issuing list and determine a state of the code of the coupon, and in a case that the coupon is in an expired or used state, the code verifying unit 3312 may regard the inquired state as the failure reason, and causes the failure reason to be carried in the process result of the failed verification.

In the embodiment of the present disclosure, a terminal can initiate a coupon verification service request to a server by using a function of processing a coupon verification service provided by a public service account of an internet application, and the request carries an operator identifier and a code of a coupon. The server processes the coupon verification service to obtain a process result and outputs the result. Therefore, convenient processing of coupon verification is achieved, the efficiency of processing a coupon verification service is improved, and the flexibility and the intelligence of coupon management are enhanced.

Figure 12:
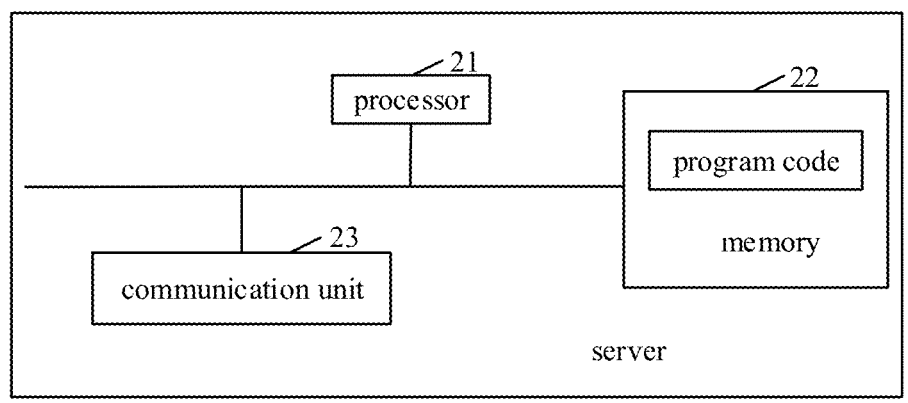
FIG. 12 is a schematic structural diagram of a server according to an embodiment of the present disclosure.

Reference is made to FIG. 12. A server is further provided according to an embodiment of the present disclosure. The server may include components, such as a processor 21, a memory 22 and a communication unit 23. The components perform communication via one or more buses. It may be understood by those skilled in the art that, a structure of the server shown in FIG. 12 should not to be construed as limiting the present disclosure. The structure of the server may be a bus structure or a star structure and may include more or less components than the structure shown in FIG. 12, or a combination of some components, or different arrangements of components.

The processor 21 is a control center of a server and connected to various parts of the server via various interfaces and lines. The processor 21 executes various functions and/or processes data of the server by running or executing program codes and/or modules stored in the memory 22, and calling data stored in the memory 22.

The memory 22 may be configured to store program codes and modules. The processor 21 executes various functional applications of the server and performs data processing by running the program codes and modules stored in the memory 12. The memory 22 mainly includes a program storage area and a data storage area. The program storage area may store an operating system and program codes required by at least one function, such as program codes for service processing. The data storage area may store data created in accordance with use of the server.

The communication unit 23 is configured to establish a communication channel to enable a server to be connected to a terminal via the communication channel.

In the server shown in FIG. 12, the processor 21 may invoke the program codes stored in the memory 22 to execute the following operations:

receiving a coupon verification service request from a terminal, where the coupon verification service request includes an operator identifier of a coupon verification operation detected by the terminal on a service page of a public service account, and a code of a coupon to be verified which is obtained by the terminal by invoking a code reading interface of an internet application to which the public service account belongs;

processing a coupon verification service based on the operator identifier and the code of the coupon to obtain a process result; and returning the process result to the terminal, to cause the terminal to output the process result on the service page of the public service account.

The processing the coupon verification service based on the operator identifier and the code of the coupon to obtain the process result includes: parsing the code of the coupon to obtain an issuer identifier corresponding to the coupon to be verified; inquiring configuration information of the issuer based on the issuer identifier, where the configuration information includes an operation authority list and a valid coupon list, the operation authority list includes at least one target identifier having a coupon verification operation authority, and the valid coupon list includes at least one available valid coupon code; and verifying the operator identifier and the code of the coupon based on the configuration information and generating the process result based on a verification result. The process result includes successful verification and failed verification. The process result of the failed verification carries a failure reason, and the failure reason includes any one or more of reasons that the operator has no operation authority, a use time of the coupon to be verified is wrong, the code of the coupon is invalid and the code of the coupon is wrong.

The verifying the operator identifier and the code of the coupon based on the configuration information and generating the process result based on the verification result includes: determining whether the operator identifier is a target identifier in the operation authority list; generating the process result of the failed verification in a case that the operator identifier is not a target identifier in the operation authority list; determining whether the code of the coupon is a valid coupon code in the valid coupon list in a case that the operator identifier is a target identifier in the operation authority list; generating the process result of the successful verification in a case that the code of the coupon is a valid coupon code in the valid coupon list; and generating the process result of the failed verification in a case that the code of the coupon is not a valid coupon code in the valid coupon list.

In the embodiment of the present disclosure, a terminal can initiate a coupon verification service request to a server by using a function of processing a coupon verification service provided by a public service account of an internet application, and the request carries an operator identifier and a code of a coupon. The server processes the coupon verification service to obtain a process result and outputs the result. Therefore, convenient processing of coupon verification is achieved, the efficiency of processing a coupon verification service processing is improved, and the flexibility and the intelligence of coupon management are enhanced.

It is understood by those skilled in the art that all or some of steps in the various methods of the above embodiments may be achieved by instructing related hardware via a computer program. The program may be stored in a computer readable storage media and include the steps in the various methods of the above embodiments when the program is executed. The storage media may include a magnetic disk, an optical disc, a read-only memory (ROM), a random access memory (RAM), and the like.

While the above describes some embodiments, the protection scope is not limited to these embodiments. Therefore, various equivalent changes made according to the claims fall within the protection scope of the present disclosure.

The invention claimed is:

1. A service processing method, comprising:
    detecting, by a terminal comprising a processor, a coupon verification operation on a service page of a public service account provided by an internet application, wherein the internet application runs on the terminal, a merchant user is registered in the internet application with an operator identifier, and the merchant user follows the public service account that provides coupon service processing;
    obtaining, by the terminal, the operator identifier, when the coupon verification operation is detected on the service page of the public service account;
    invoking, by the terminal, a code reading interface of the internet application to which the public service account belongs, to obtain a code of a coupon to be verified;
    generating, by the terminal, a coupon verification service request based on the operator identifier and the code of the coupon;
    sending, by the terminal, the coupon verification service request to a server, to cause the server to process a coupon verification service based on the operator identifier and the code of the coupon and return a process result to the terminal;
    in response to receiving the coupon verification service request, determining the operator identifier from the coupon verification service request and accessing, by the server, an operation authority list identifying a plurality of identifiers for a plurality of granted clerks of the merchant user;
    identifying, by the server, whether the merchant user is authorized based on a comparison of the operator identifier and the plurality of identifiers for the plurality of granted clerks in the operation authority list;
    determining, by the server, the process result based on identifying whether the merchant user is authorized;
    sending, by the server, the process result to the terminal;
    outputting, by the terminal, the process result on the service page of the public service account.

2. The service processing method according to claim 1, wherein invoking, by the terminal, the code reading interface of the internet application to which the public service account belongs, to obtain the code of the coupon to be verified comprises:
    invoking, by the terminal, a code scanning interface of the internet application to which the public service account belongs, to scan a graphic code on the coupon to be verified via the code scanning interface and obtain the code of the coupon to be verified; or
    invoking, by the terminal, a code inputting interface of the internet application to which the public service account belongs, to receive the code of the coupon to be verified which is inputted by an operator via the code inputting interface.

3. The service processing method according to claim 1, wherein:
    the process result comprises successful verification and failed verification; and
    the process result of the failed verification carries a failure reason, and the failure reason comprises any one or more of reasons that the operator has no operation authority, a use time of the coupon to be verified is wrong, the code of the coupon is invalid or the code of the coupon is wrong.

4. The service processing method according to claim 2, wherein:
    the process result comprises successful verification and failed verification; and
    the process result of the failed verification carries a failure reason, and the failure reason comprises any one or more of reasons that the operator has no operation authority, a use time of the coupon to be verified is wrong, the code of the coupon is invalid or the code of the coupon is wrong.

5. The service processing method according to claim 3, wherein, after outputting by the terminal the process result on the service page of the public service account, the method further comprises:
    adding, by the terminal, the process result into service history records of the public service account; and
    outputting, by the terminal, a service history record on the service page of the public service account, when an access request for the service history record is received.

6. The service processing method according to claim 4, wherein, after outputting by the terminal the process result on the service page of the public service account, the method further comprises:

adding, by the terminal, the process result into service history records of the public service account; and outputting, by the terminal, a service history record on the service page of the public service account, when an access request for the service history record is received.

7. A system comprising a service processing device, the service processing device comprising:
a memory configured to store program codes; and
a processor configured to execute the program codes to:
receive a coupon verification service request from a terminal of a merchant user, where the coupon verification service request includes an operator identifier with which a merchant user is registered in an internet application that provides a public service account and that includes a service page on which the terminal detects a coupon verification operation, and a code of a coupon to be verified which is obtained by the terminal by invoking a code reading interface of an internet application to which the public service account belongs;
in response to the coupon verification service request, determine the operator identifier from the coupon verification service request and access an operation authority list identifying a plurality of identifiers for a plurality of granted clerks of the merchant user;
identify whether the merchant user is authorized based on a comparison of the operator identifier and the plurality of identifiers for the plurality of granted clerks in the operation authority list;
determine the process result based on whether the merchant user is authorized; and
send the process result to the terminal, to cause the terminal to output the process result on the service page of the public service account.

8. The system according to claim 7, wherein the system further comprises the terminal, and wherein the terminal is configured to invoke the code reading interface of the internet application to which the public service account belongs by:
invoking a code scanning interface of the internet application to which the public service account belongs, to scan a graphic code on the coupon to be verified via the code scanning interface and obtain the code of the coupon to be verified; or
invoking a code inputting interface of the internet application to which the public service account belongs, to receive the code of the coupon to be verified which is inputted by an operator via the code inputting interface.

9. The system according to claim 7, wherein:
the process result comprises a failed verification that carries a failure reason comprising one or more reasons that the operator has no operation authority, a use time of the coupon to be verified is wrong, the code of the coupon is invalid or the code of the coupon is wrong.

10. The system according to claim 8, wherein:
the process result comprises a failed verification that carries a failure reason comprising one or more reasons that the operator has no operation authority, a use time of the coupon to be verified is wrong, the code of the coupon is invalid or the code of the coupon is wrong.

11. The system according to claim 9, wherein the system further comprises the terminal, the terminal configured to:
add the process result into service history records of the public service account, after the process result is outputted on the service page of the public service account; and
output a service history record on the service page of the public service account, when an access request for the service history record is received.

12. The system according to claim 10, wherein the system further comprises the terminal, the terminal configured to:
add the process result into service history records of the public service account, after the process result is outputted on the service page of the public service account; and
output a service history record on the service page of the public service account, when an access request for the service history record is received.

13. The system according to claim 7, wherein the processor is configured to execute the program codes further to:
parse the code of the coupon; and
identify the operator identifier in response to the parsing.

14. One or more non-transitory computer storage media comprising computer executable instructions that, when executed by one or more processors, cause the one or more processors to perform the following operations:
receiving a coupon verification service request from a terminal of a merchant user, where the coupon verification service request includes an operator identifier with which a merchant user is registered in an internet application that provides a public service account and that includes a service page on which the terminal detects a coupon verification operation, and a code of a coupon to be verified which is obtained by the terminal by invoking a code reading interface of an internet application to which the public service account belongs;
in response to the coupon verification service request, determining the operator identifier from the coupon verification service request and access an operation authority list identifying a plurality of identifiers for a plurality of granted clerks of the merchant user;
identifying whether the merchant user is authorized based on a comparison of the operator identifier and the plurality of identifiers for the plurality of granted clerks in the operation authority list;
determining the process result based on whether the merchant user is authorized; and
sending the process result to the terminal, to cause the terminal to output the process result on the service page of the public service account.

15. The one or more non-transitory computer storage media according to claim 14, wherein the operations further comprise invoking the code reading interface of the internet application to which the public service account belongs by:
invoking a code scanning interface of the internet application to which the public service account belongs, to scan a graphic code on the coupon to be verified via the code scanning interface and obtain the code of the coupon to be verified; or
invoking a code inputting interface of the internet application to which the public service account belongs, to receive the code of the coupon to be verified which is inputted by an operator via the code inputting interface.

16. The one or more non-transitory computer storage media according to claim 14, wherein:
the process result comprises a failed verification that carries a failure reason comprising one or more reasons that the operator has no operation authority, a use time of the coupon to be verified is wrong, the code of the coupon is invalid or the code of the coupon is wrong.

17. The one or more non-transitory computer storage media according to claim 15, wherein:
the process result comprises a failed verification that carries a failure reason comprising one or more reasons that the operator has no operation authority, a use time of the coupon to be verified is wrong, the code of the coupon is invalid or the code of the coupon is wrong.

18. The one or more non-transitory computer storage media according to claim 16, wherein the operations further comprise:
adding the process result into service history records of the public service account, after the process result is outputted on the service page of the public service account; and
outputting a service history record on the service page of the public service account, when an access request for the service history record is received.

19. The one or more non-transitory computer storage media according to claim 17, wherein the operations further comprise:
adding the process result into service history records of the public service account, after the process result is outputted on the service page of the public service account; and
outputting a service history record on the service page of the public service account, when an access request for the service history record is received.

20. The one or more non-transitory computer storage media according to claim 14, wherein the operations further include:
parsing the code of the coupon; and
identify the operator identifier in response to the parsing.

* * * * *